(12) United States Patent
Schmitz et al.

(10) Patent No.: US 6,333,620 B1
(45) Date of Patent: Dec. 25, 2001

(54) METHOD AND APPARATUS FOR ADAPTIVELY CONTROLLING A STATE OF CHARGE OF A BATTERY ARRAY OF A SERIES TYPE HYBRID ELECTRIC VEHICLE

(75) Inventors: Robert W. Schmitz, Littleton; Thomas F. Wilton, Aurora; Joshua J. Anderson, Edgewater, all of CO (US)

(73) Assignee: Transportation Techniques LLC, Denver, CO (US)

( * ) Notice: Subject to any disclaimer, the term of this patent is extended or adjusted under 35 U.S.C. 154(b) by 0 days.

(21) Appl. No.: 09/663,118

(22) Filed: Sep. 15, 2000

(51) Int. Cl.⁷ .......................... H01M 10/44; H01M 10/46
(52) U.S. Cl. ............................................................. 320/132
(58) Field of Search .................................... 320/103, 104, 320/132; 429/61, 90; 340/635, 636

(56) References Cited

U.S. PATENT DOCUMENTS

| | | |
|---|---|---|
| 4,187,436 | 2/1980 | Etienne . |
| 5,285,862 | 2/1994 | Furutani et al. . |
| 5,318,142 | 6/1994 | Bates et al. . |
| 5,345,155 | 9/1994 | Masaki et al. . |
| 5,481,460 | 1/1996 | Masaki et al. . |
| 5,512,022 | 4/1996 | Suzuki . |
| 5,589,743 | 12/1996 | King . |
| 5,629,586 | 5/1997 | Yasuda et al. . |
| 5,629,596 | 5/1997 | Iijima et al. . |
| 5,642,270 | 6/1997 | Green et al. . |
| 5,650,713 | 7/1997 | Takeuchi et al. . |
| 5,726,541 | 3/1998 | Glenn et al. . |
| 5,739,664 | 4/1998 | Deng . |
| 5,804,935 | 9/1998 | Radev . |
| 5,878,830 | 3/1999 | Ruppert et al. . |
| 5,898,282 | 4/1999 | Drozdz et al. . |
| 5,905,349 | 5/1999 | Farkas et al. . |
| 5,915,488 | 6/1999 | Fliege . |
| 5,924,504 | 7/1999 | Ruppert, Jr. et al. . |
| 6,242,873 | 6/2001 | Drozdz et al. . |

FOREIGN PATENT DOCUMENTS

| | | |
|---|---|---|
| 197 22 175 A1 | 12/1997 | (DE) . |
| 0 177 770 A1 | 4/1986 | (EP) . |
| 0 496 059 A1 | 7/1992 | (EP) . |
| 0 906 847 A2 | 4/1999 | (EP) . |
| 0 925 988 A2 | 6/1999 | (EP) . |
| WO 94/07301 | 3/1994 | (WO) . |
| WO 98/01941 | 1/1998 | (WO) . |

*Primary Examiner*—Edward H. Tso
(74) *Attorney, Agent, or Firm*—Oliff & Berridge, PLC (57) ABSTRACT

A series type hybrid electric vehicle including a generator set having an internal combustion engine and a generator, a battery array and at least one electric motor includes a controller for maintaining a state of charge of the battery array within a control limit. A controller of the vehicle determines if the vehicle is in one of a plurality of forward driving modes, compares a state of charge of the battery array to an upper control limit associated with a forward driving mode, decreases generated by the generator, if the state of charge is equal to or greater than the associated upper control limit, and increases the power generated by the generator, if the state of charge is less than the associated upper control limit. A method of controlling the state of charge of the battery array includes determining if the vehicle is in one of a plurality of forward driving modes, comparing a state of charge of the battery array to an upper control limit associated with a forward driving mode, decreasing the power generatred by the generator, if the state of charge is equal to or greater than the associated upper control limit, and increasing the power generated by the generator, if the state of charge is less than the associated upper control limit.

29 Claims, 11 Drawing Sheets

METHOD AND APPARATUS FOR ADAPTIVELY CONTROLLING A STATE OF CHARGE OF A BATTERY ARRAY OF A SERIES TYPE HYBRID ELECTRIC VEHICLE

BACKGROUND OF THE INVENTION

1. Field of Invention

This invention relates to methods and apparatus for adaptively controlling the state of charge of a battery array of a series hybrid electric vehicle.

2. Description of Related Art

The desire for cleaner air has caused various federal, state, and local governments to change their regulations to require lower vehicle emissions. Increasing urban traffic congestion has prompted a need for increases in public mass transit services. Many large cities use buses to transport people into, out of, and within traffic congested urban areas. Conventional buses use diesel powered internal combustion engines. Diesel engines produce emissions, including carbon monoxide, that contribute to air pollution. It is possible to refine cleaner diesel fuel. However, cleaner diesel fuel is more costly to refine and causes a corresponding increase in the cost of bus service.

Alternative fuels have been used to reduce emissions and conserve oil resources. Compressed natural gas has been used as an alternative fuel. Compressed natural gas does not produce as much power in conventional internal combustion engines as gasoline and diesel and has not been widely developed or accepted as an alternative to gasoline and diesel.

Additives have also been developed for mixing with gasoline to reduce emissions. Ethanol and MTBE have been added to gasoline to oxygenate the combustion of gasoline and reduce emissions of carbon monoxide. These additives, however, are believed to cause decreased gas mileage and, in the case of MTBE, to be a potential public health threat.

Electric vehicles have been developed that produce zero emissions. Electric vehicles are propelled by an electric motor that is powered by a battery array on board the vehicle. The range of electric vehicles is limited as the size of the battery array which can be installed on the vehicle is limited. Recharging of the batteries can only be done by connecting the battery array to a power source. Electric vehicles are not truly zero emitters when the electricity to charge the battery array is produced by a power plant that burns, for example, coal.

Hybrid electric vehicles have also been developed to reduce emissions. Hybrid electric vehicles include an internal combustion engine and at least one electric motor powered by a battery array. In a parallel type hybrid electric vehicle, both the internal combustion engine and the electric motor are coupled to the drive train via mechanical means. The electric motor may be used to propel the vehicle at low speeds and to assist the internal combustion engine at higher speeds. The electric motor may also be driven, in part, by the internal combustion engine and be operated as a generator to recharge the battery array.

In a series type hybrid electric vehicle, the internal combustion engine is used only to run a generator that charges the battery array. There is no mechanical connection of the internal combustion engine to the vehicle drive train. The electric traction drive motor is powered by the battery array and is mechanically connected to the vehicle drive train.

In present hybrid electric vehicles, the internal combustion engine and the generator are designed based to meet the peak power demands that the vehicle will encounter. The engine, the generator, and the electric motor must be "oversized" to meet the peak power demand. The need to meet the peak power demand, as opposed to the average or normal power demand, causes an increase in the size and cost of the engine and the generator and a decrease in reliability and efficiency of the vehicle. Present series type hybrid electric buses, for example, include a 250 Hp diesel engine and a 250 Hp electric traction drive motor. The performance enhancement factor (PEF), the ratio of the power of the electric motor to the power of the internal combustion engine, for such a vehicle is 1. The present series type hybrid electric buses require a larger internal combustion engine in order to maintain the power output after the battery array has been substantially discharged. The internal combustion engine must also be large enough to run the generator to produce additional power for additional systems, such as heating the bus and running pumps and fans of cooling systems, that operate simultaneously.

SUMMARY OF THE INVENTION

The invention provides methods and apparatus for adaptively managing the power created, stored and consumed by series type hybrid electric vehicles.

An exemplary embodiment of a series type hybrid electric vehicle according to the invention is controlled so that a generator set of the vehicle including an internal combustion engine connected to a generator creates only the power required for maintaining the state of charge (SOC) of a battery array within a predetermined range. As the state of charge approaches an upper control limit, the power output of the generator set is decreased and eventually turned off to prevent exceeding the SOC level for a selected driving mode. As the state of charge declines, the generator set is turned on to prevent excessive discharge of the battery array below the SOC level for the selected driving mode. A closed loop control is used to maintain the state of charge within a control limit.

According to an exemplary embodiment, a method for adaptively controlling the state of charge of a battery array of a series type hybrid electric vehicle having an internal combustion engine connected to a generator and at least one electric motor includes determining a driving mode of the vehicle, comparing the state of charge of the battery array to an upper control limit associated with the driving mode, decreasing a power generated by the generator set if the state of charge is equal to or greater than the associated upper control limit, and increasing the power generated by the generator set if the state of charge is less than the associated upper control limit.

According to another exemplary embodiment, a series type hybrid electric vehicle includes an internal combustion engine connected to a generator, a battery array receiving current at least from the generator, at least one electric motor receiving current from the battery array, and a controller that determines if the vehicle is in one of a plurality of forward driving modes, compares the state of charge of the battery array to an upper control limit associated with a forward driving mode, decreases a power generated by the generator set, if the initial state of charge is equal to or greater than the associated upper control limit, and increases the power generated by the generator set, if the initial state of charge is less than the associated upper control limit.

Other features of the invention will become apparent as the following description proceeds and upon reference to the drawings.

BRIEF DESCRIPTION OF THE DRAWINGS

Various exemplary embodiments of this invention will be described in detail with reference to the following figures, wherein like numerals reference like elements, and wherein.

DESCRIPTION OF EXEMPLARY EMBODIMENTS

Figure 1:
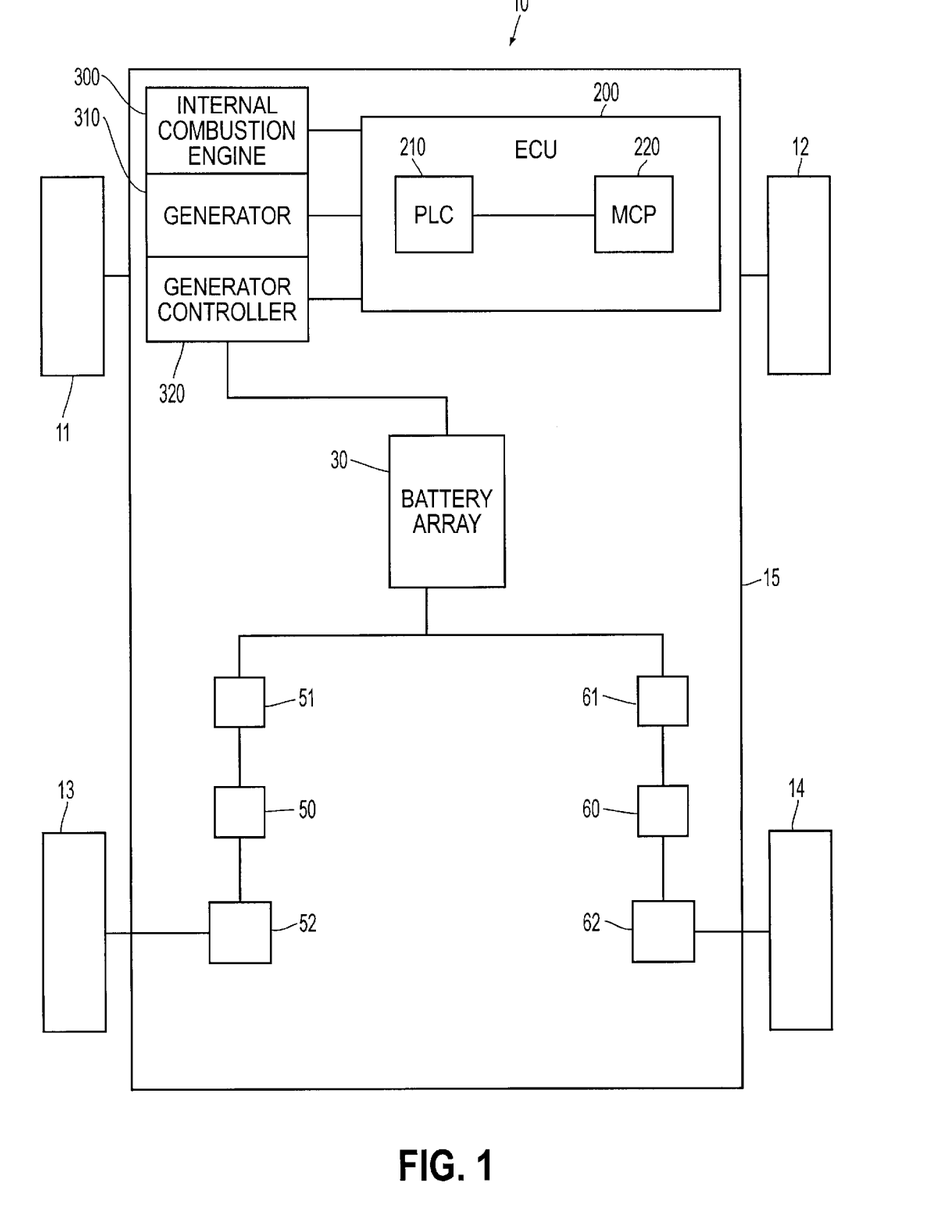
FIG. 1 is schematic view of an exemplary embodiment of a series hybrid electric vehicle according to the invention.

Referring to FIG. 1, an exemplary embodiment of a series type hybrid electric vehicle 10 according to the invention includes a plurality of wheels 11, 12, 13, and 14 and a vehicle chassis 15. The wheels 13 and 14 are coupled to electric motors 50 and 60, respectively, through gear boxes 52 and 62, respectively. The wheels 13 and 14 are independently mounted to respective suspension components, such as swing arms. In this embodiment, the wheels 13 and 14 are not coupled together by an axle. In other embodiments, the wheels 13 and 14 may be coupled together, for example, by an axle. The wheels 13 and 14 may be either the front wheels or the rear wheels of the vehicle 10. In this embodiment, the wheels 11 and 12 are not driven and may be coupled together by an axle. In other embodiments, the wheels 11 and 12 may be driven.

In an exemplary embodiment of the vehicle according to the invention, the vehicle 10 is a bus having an occupancy capacity in excess of 100. However, it should be appreciated that the vehicle may be a bus of a smaller capacity or that the vehicle may be a smaller passenger vehicle, such as a sedan. In various exemplary embodiments, the vehicle may be any size and form currently used or later developed.

The electric motors 50 and 60 are powered by a battery array 30 and are controlled by motor controllers 51 and 61, respectively. According to an exemplary embodiment of the vehicle 10, the electric motors 50 and 60 are synchronous, permanent magnet DC brushless motors. Each electric motor 50 and 60 is rated for 220 Hp and 0–11,000 rpm. The maximum combined power output of the electric motors 50 and 60 is thus 440 Hp. The permanent magnet DC brushless motors include permanent magnets, such as rare earth magnets, for providing a magnetic field as opposed to AC induction motors which create or induce a magnetic field on the rotating portion of the motor. The DC brushless motors are thus inherently more efficient than AC induction motors as no losses occur from inducing the magnetic field. The DC brushless motors also have a more useful torque profile, a smaller form factor, and lower weight than AC induction motors. The DC brushless motors also require less energy input for an equivalent power output than AC induction motors. However, this invention is not limited to permanent magnet DC brushless motors, and other types of electric motors, such as AC induction motors, can be used.

The series type hybrid electric vehicle 10 also includes a generator set (genset) 300, 310 including an internal combustion engine 300 and a generator 310 that is driven by the internal combustion engine 300. The internal combustion engine 300 may be powered by gasoline, diesel, or compressed natural gas. It should be appreciated, however, that the internal combustion engine 300 may be replaced by a fuel cell, turbine or any other number of alternatives for creating usable electric power. According to an exemplary embodiment of the invention, the internal combustion engine 300 may be a 2.5 liter Ford LRG-425 engine powered by compressed natural gas. The engine 300 is operated to produce 70 Hp. It should be appreciated that the power of the engine 300 may be increased by increasing the RPM of the engine 300 and decreased by decreasing the RPM of the engine 300. In this embodiment with two 220 Hp electric motors 50 and 60 and an internal combustion engine 300 operating at 70 Hp, the performance enhancement factor of the vehicle 10 is 440/70, or at least 6.2. Other internal combustion engines can of course be utilized.

The generator 310 is a DC brushless generator that produces, for example, 240–400 $V_{AC}$. In an exemplary embodiment of the vehicle 10, the generator is operated to produce 345 $V_{AC}$ during certain drive modes. An output shaft of the internal combustion engine 300 is connected to the generator 310 and the AC voltage of the generator 310 is converted to a DC voltage by a generator controller 320. The converted DC voltage charges the battery array 30. The battery array may include, for example, 26 deep cycle, lead-acid batteries of 12 volts each connected in series. It should be appreciated, however, that other batteries, such as nickel cadmium, metal hydride or lithium ion, may be used and that any number of batteries can be employed, as space permits. Depending upon the load on the vehicle 10, the battery array voltage ranges between 240 and 400 $V_{DC}$.

An electronic control unit (ECU) 200 includes a programmable logic controller (PLC) 210 and a master control panel (MCP) 220. The MCP 220 receives input from various sensors and provides the connection to outputs in the vehicle 10 and the PLC 210 executes various programs to control, for example, the internal combustion engine 300, the generator 310, the generator controller 320, the electric motors 50 and 60, and the motor controllers 51 and 61.

Although not shown in the drawings, the vehicle 10 includes a cooling system or cooling systems for the internal combustion engine 300, the generator controller 320, the battery array 30, and the motor controllers 51 and 61. The cooling system may be a single system which includes a coolant reservoir, a pump for pumping the coolant through a heat exchanger such as a radiator and a fan for moving air across the heat exchanger or a plurality of cooling systems similarly constructed. The ECU 200 controls the cooling systems, including the pumps and the fans, to perform a heat shedding operation in which the heat generated by the engine 300, the controllers 320, 51, and 61, the battery array 30, and various other systems is released to the atmosphere. Any acceptable means and methods for cooling the vehicle components may be utilized.

Figure 2:
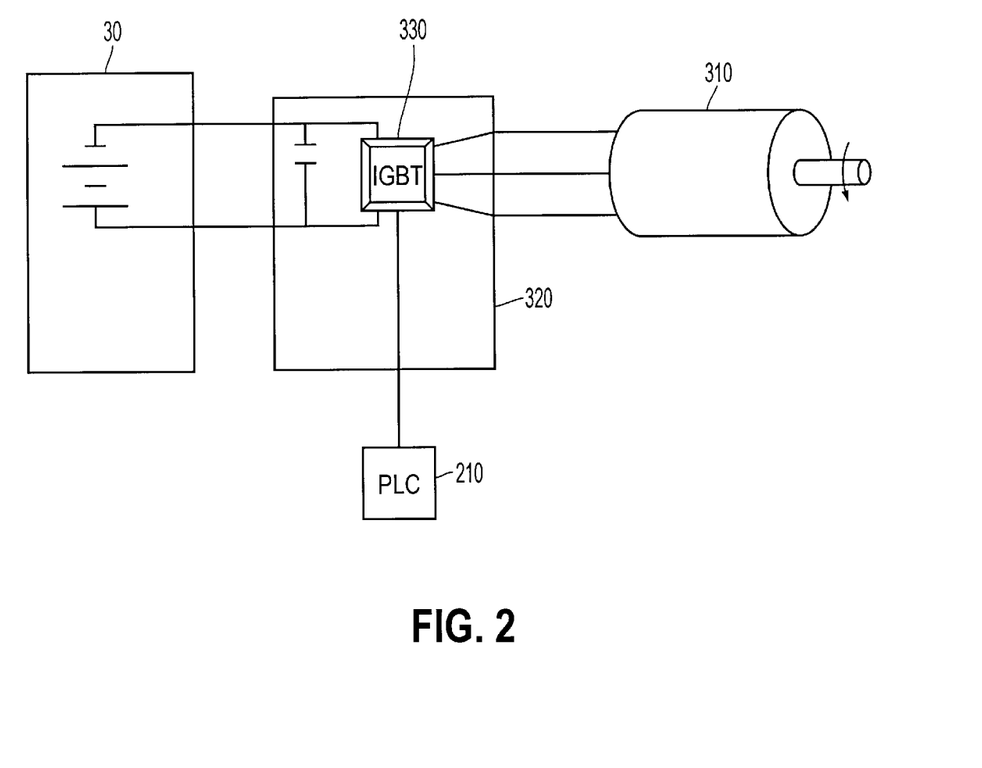
FIG. 2 is a schematic diagram illustrating an exemplary embodiment of a circuit for controlling charging of the battery array by the generator.

As shown in FIG. 2, the coils of the generator 310 are connected to the generator controller 320. The generator controller 320 includes two switching insulated or isolated gate bipolar transistors (IGBT) 330 per phase of the generator 310 and their corresponding diodes. In an exemplary embodiment including a three phase generator 310, the generator controller includes 6 IGBT 330. The PLC 210 controls each IGBT 330 of the generator controller 320 to control the conversion of the AC voltage of the generator 310 to the DC voltage for charging the battery array 30. The PLC 210 may switch the IGBT 330 off when the SOC of the battery array 30 reaches an upper control limit to stop the conversion of the AC voltage to DC voltage and prevent overcharging of the battery array 30.

According to an exemplary embodiment of the invention, the engine 300 runs continuously during operation of the vehicle 10 and continuously turns the shaft of the generator 310. The PLC 210 switches each IGBT 330 on and off via high speed pulse width modulation (PWM) to control charging of the battery array 30. It should be appreciated however that the PLC 210 may control the engine 300 by turning the engine 300 on and off to control charging of the battery array 30.

Figure 3:
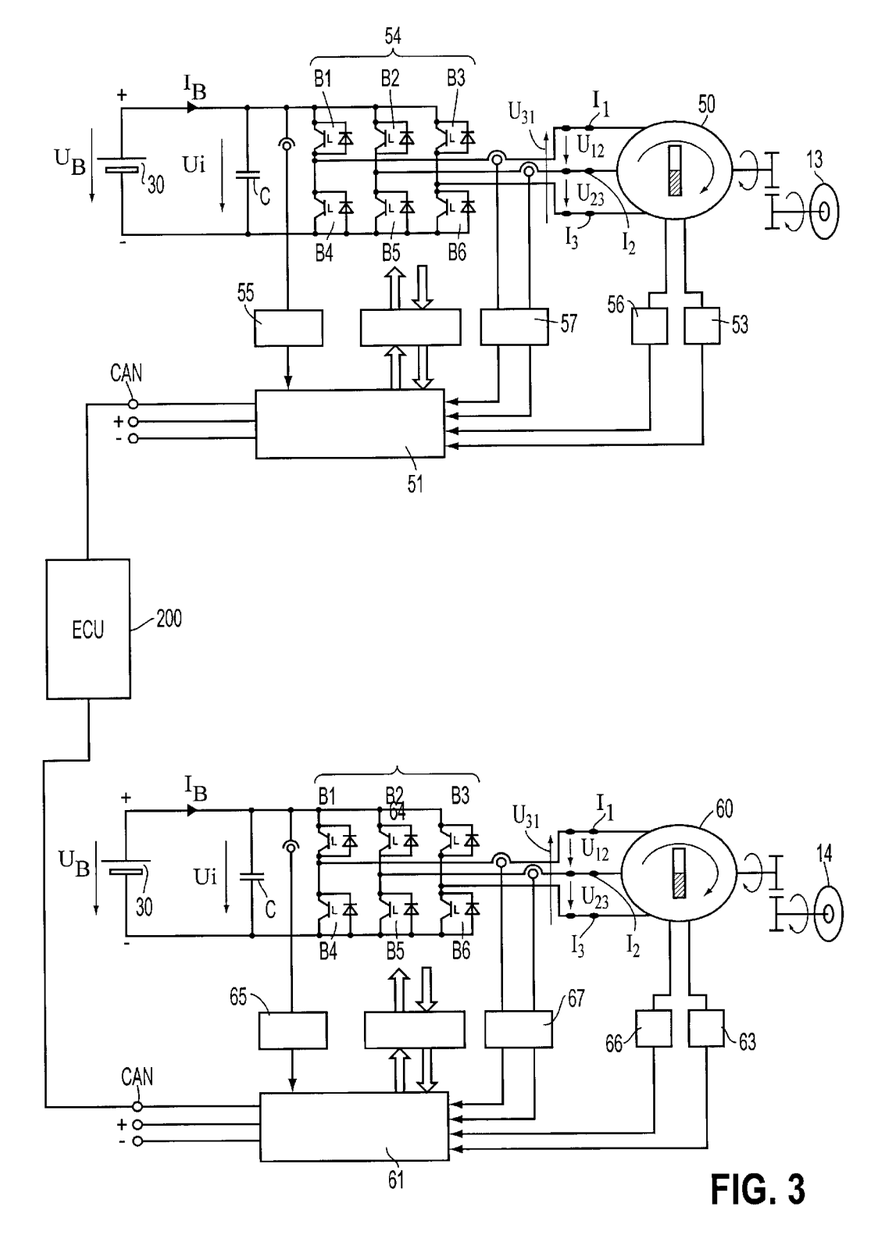
FIG. 3 is a diagram illustrating an exemplary embodiment of a circuit for controlling the electric motors.

Referring to FIG. 3, a control circuit for the electric motors 50 and 60 includes the motor controllers 51 and 61. The motor controllers 51 and 61 receive power from the battery array 30 and distribute the power to the electric motors 50 and 60 by switches B1–B6 of pulse width modulation (PWM) inverters 54 and 64. The PWM inverters 54 and 64 generate AC current from the DC battery array 30. The battery current $I_B$ is distributed by the switches B1–B6, for example IGBT, of the PWM inverters 54 and 64 into motor currents $I_1$, $I_2$, and $I_3$ for driving the motors 50 and 60. The motor controllers 51 and 61 distribute the battery current $I_B$ via the switches B1–B6 by factoring feedback from position sensors 53 and 63 and encoders 56 and 66 that determine the timing or pulsing of electromagnets of the motors 50 and 60. The pole position sensors 53 and 63 determine the pole positions of the permanent magnets of the motors 50 and 60 and the encoders 56 and 66 determine the phase angle. It should be appreciated that each pair of pole position sensors 53 and 63 and encoders 56 and 66, respectively, may be replaced by a phase position sensor and the phase change frequency may be read to determine the speed of rotation of the electric motors 50 and 60.

The motor controllers 51 and 61 calculate the motor connector voltages $U_{12}$, $U_{31}$, and $U_{23}$ based on the rotary velocity and the known flux value of the motors 50 and 60 between the motor connectors. The operating point of the inverters 54 and 64 is then determined by the rectified voltages of the diodes of the switches B1–B6 or by the voltage Ui of an intermediate circuit including a capacitor C. If the voltage Ui becomes larger than the battery voltage $U_B$, uncontrolled current may flow to the battery array 30. Voltage sensors 55 and 65 determine the voltage Ui and the motor controllers 51 and 61 compare the voltage Ui to the battery voltage $U_B$. The motor controllers 51 and 61 activate the switches B1–B6 to cause magnetizing current to flow to the motors 50 and 60 to avoid unnecessary recharging of the battery array 30.

As shown in FIG. 3, each motor controller 51 and 61 receives control data from the ECU 200 through a controller area network (CAN). The ECU 200 can communicate with the various sensors and the motor controllers 51 and 61 by, for example, DeviceNet™, an open, global industry standard communication network.

Figure 4:
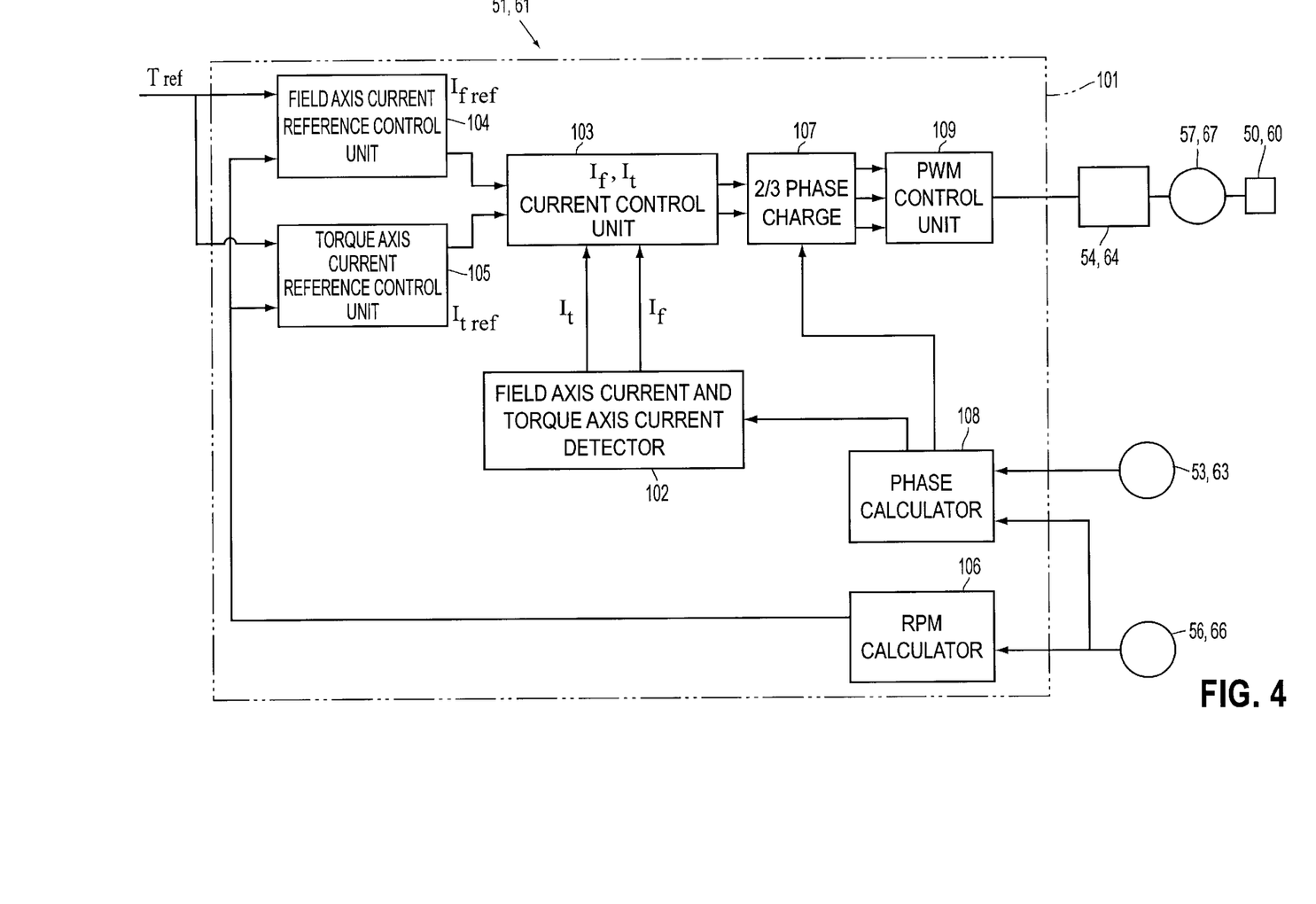
FIG. 4 is a diagram illustrating an exemplary embodiment of a circuit of the motor controllers.

Referring to FIG. 4, each motor controller 51 and 61 includes a control unit 101 including a field axis current and torque axis current detector 102. The detector 102 calculates the torque axis current $I_t$ and the field axis current $I_f$ by executing a 3-phase, 2-phase coordinate transfer from the input of current detectors 57 and 67 that measure the 3-phase AC current of the motors 50 and 60. The output of detector 102 goes to a field axis current and torque axis current control unit 103. The current control unit 103 receives a field axis current reference value $I_{fref}$ from a field axis current reference control unit 104 and receives a torque axis current reference value $I_{tref}$ from a torque axis current reference control unit 105.

The reference control units 104 and 105 determine the current reference values $I_{fref}$ and $I_{tref}$ by comparing a torque reference value $T_{ref}$ (which is determined by the position of an accelerator pedal of the vehicle) with the actual rotational velocity determined by an rpm calculator 106 that receives input from the encoders 56 and 66. A 2/3 phase changer 107 receives input from a phase calculator 108 and calculates the 3-phase AC reference values by performing a 2-phase/3-phase coordinate transformation. A PWM control unit 109 generates a PWM signal by comparing the 3-phase reference values with a triangular wave signal which is input to the PWM inverters 54 and 64.

Figure 5:
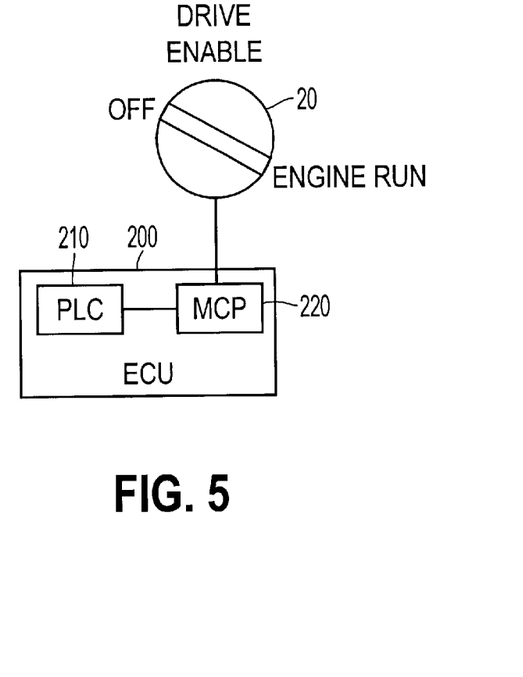
FIG. 5 is a diagram illustrating an exemplary embodiment of a master control switch.

Referring to FIG. 5, a master control switch 20 positioned, for example, in an operator area of the vehicle 10, includes an off position, a drive enable position and an engine run position. Any acceptable switch mechanism can be employed. The rotary switch 20 in FIG. 5 is merely an example of an acceptable switch. The position of the switch 20 is input to the MCP 220. When the switch 20 is moved to the drive enable position, the PLC 210 controls the electric motors 50 and 60 to run the vehicle in a driver selected zero emissions mode by drawing power from the battery array 30. The engine 300 is not operated during the zero emissions mode. The range of the vehicle 10 in zero emissions mode is limited as the SOC of the battery array 30 will eventually be lowered below a level sufficient to drive the electric motors 50 and 60 to propel the vehicle.

When the switch 20 is moved to the engine run position, the ECU 200 instructs the generator 310 to operate as a motor for starting the engine 300. During the starting of the engine 300, the generator 310 receives current from the battery array 30. The current is supplied until the engine 300 reaches a predetermined idling speed and then the current supply is stopped. The engine 300 then drives the generator 310 to charge the battery array 30, as necessary. The ECU 200 controls the engine 300 by monitoring the engine speed (rpm) as sensed by a tachometer (not shown) and the fuel mixture as sensed by an oxygen sensor (not shown). The ECU 200 may, for example, control a fuel injection amount of the engine 300 and/or the position of a throttle valve of the engine 300. The ECU 200 may also monitor engine conditions such as the oil pressure and the coolant temperature as detected by sensors (not shown). An automatic zero emission mode is provided by the ECU 200 while in the engine run position when the SOC of the battery array 30 is sufficient or when the sensors of the vehicle 10 sense areas and routes where zero emission modes are required.

Figure 6:
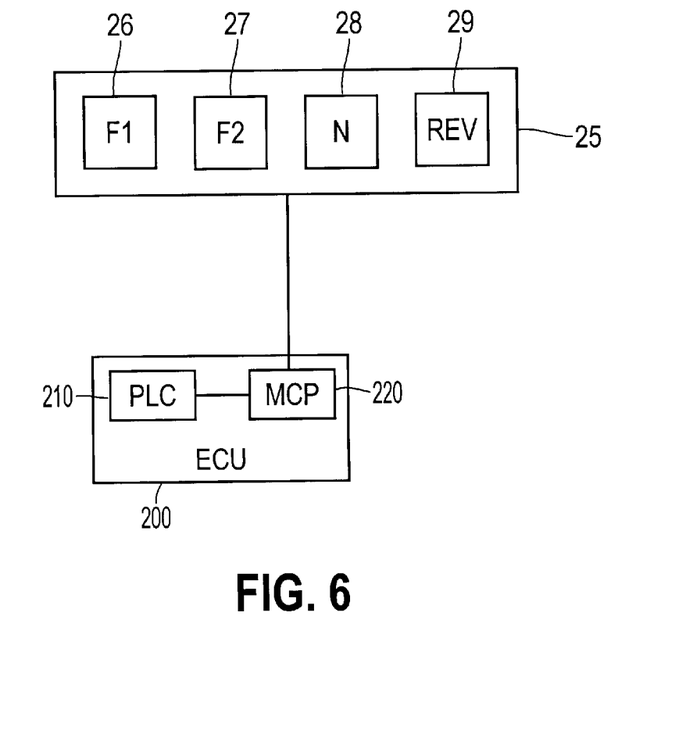
FIG. 6 is a diagram illustrating an exemplary embodiment of a driver's input control panel.

Referring to FIG. 6, a control panel 25 positioned, for example, in the operator area of the vehicle 10, includes a plurality of switches 26–29. After starting the vehicle 10 by moving the master switch 20 to the engine run position, one of the switches 26–29 is selected to establish a driving mode of the vehicle 10. A first driving mode F1 is established by selecting switch 26. The first driving mode F1 is established for driving the vehicle at lower speeds under conditions in which the vehicle 10 will start and stop frequently. A second driving mode F2 is established by selecting switch 27. The second driving mode F2 is established for driving the vehicle at higher speeds and under conditions in which the vehicle is started and stopped less frequently. The ECU 200 controls the electric motors 50 and 60 depending on which driving mode is established. The maximum power output and rpm of the electric motors 50 and 60 in the second driving mode F2 are higher than the maximum power output and rpm of the motors 50 and 60 in the first driving mode F1.

While two driving modes are shown, any number of modes can be used, depending on the driving conditions, road conditions, weather conditions, and the like.

The control panel 25 also includes a switch 28 to establish a neutral mode N. In the neutral mode N, the electric motors 50 and 60 are disengaged by the ECU 200. A reverse mode R is established by selecting a switch 29. In the reverse mode R, the electric motors 50 and 60 are controlled to rotate in the opposite direction of the first and second driving modes F1 and F2.

Figure 7:
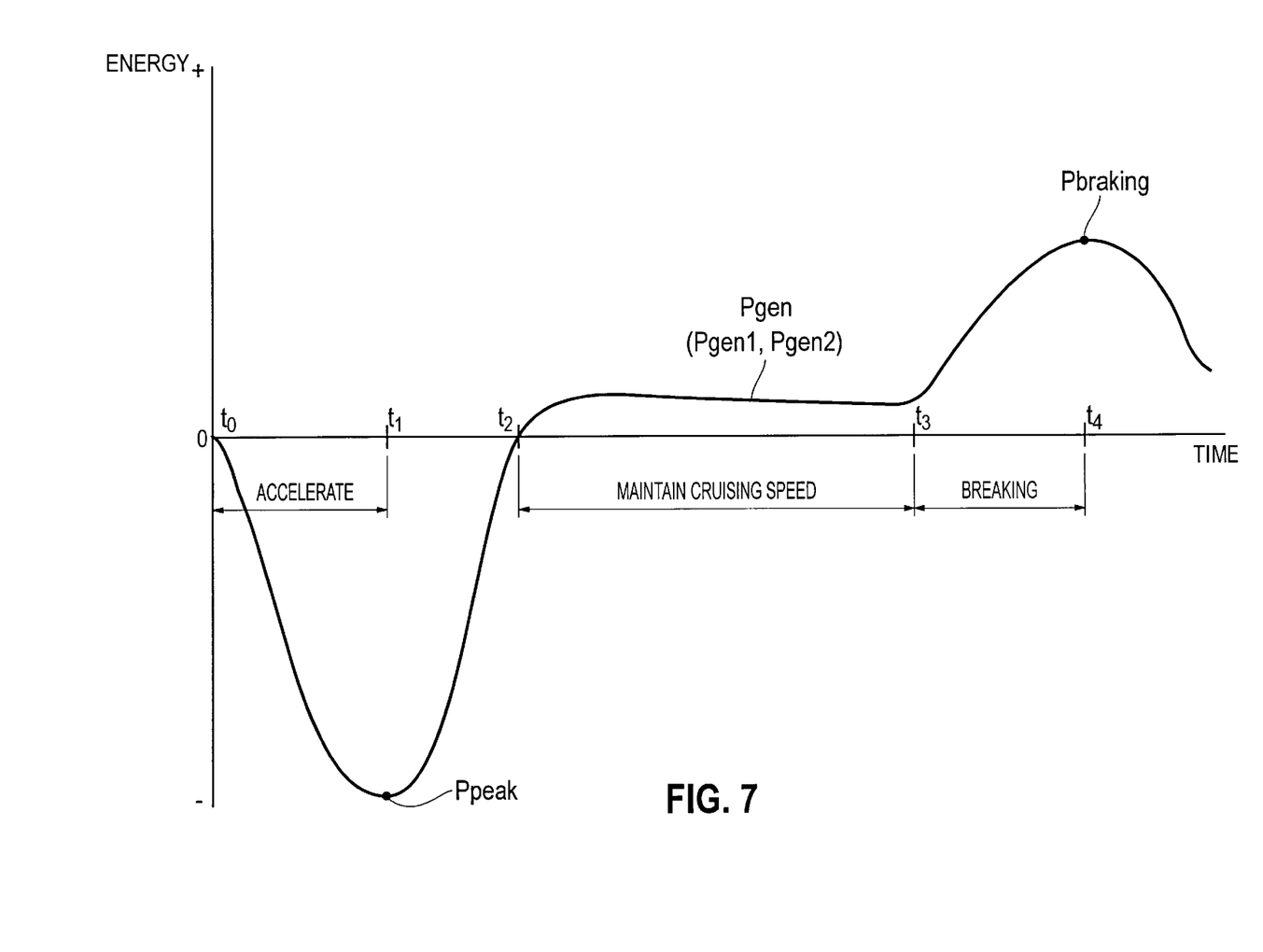
FIG. 7 is a diagram illustrating the relationship between the power created, the power stored, and the power consumed by the series hybrid electric vehicle.

Referring to FIG. 7, the relationship between the power generated, the power stored, and the power consumed over time, by the series hybrid electric vehicle 10 according to the invention will be explained.

Power is consumed from the battery array 30 by the electric motors 50 and 60 during acceleration of the vehicle 10 to a cruising speed. As shown in FIG. 7, the vehicle 10 reaches cruising speed at time $t_1$, which corresponds to a peak power $P_{peak}$ of the electric motors 50 and 60. The peak power $P_{peak}$ the electric motors 50 and 60 is dependent on the driving mode of the vehicle 10 selected by the operator. In the exemplary embodiment of the invention in which the electric motors 50 and 60 are each 220 Hp, the peak power $P_{peak}$ consumed by the electric motors 50 and 60 is 440 Hp.

The power consumption (traction effort) of the electric motors 50 and 60 during acceleration is represented by the curve below the horizontal axis and the area defined by the curve below the horizontal axis between the times $t_0$ and $t_2$ represents the total power consumption of the vehicle 10 during acceleration. In the event that the SOC of the battery array 30 is insufficient to achieve the cruising speed, the ECU 200 controls the motor controllers 51 and 61 to limit the peak power $P_{peak}$ the electric motors 50 and 60 may draw from the battery array 30. After the vehicle 10 has accelerated to cruising speed, the traction effort of the electric motors 50 and 60 may be reduced between the time $t_1$ and a time $t_2$, and the power consumption by the electric motors 50 and 60 may also be reduced.

The cruising speed of the vehicle 10 is maintained between the time $t_2$ and a time $t_3$. During the time between $t_2$ and $t_3$, the genset 300, 310 is operated to produce power $P_{gen}$ higher than the power consumption (traction effort) of the electric motors 50 and 60 necessary to maintain the vehicle's crusing speed. The differential in power between the traction effort and the power generated $P_{gen}$ is stored in the battery array 30.

The power $P_{gen}$ generated by the genset 300, 310 is dependent on the rpm of the engine 300 and a user demand signal sent to the genset 300, 310 that is controlled by the ECU 200. The ECU 200 controls the engine 300 to generally maintain the rpm of the engine 300, and the power generated $P_{gen}$, constant. However, it should be appreciated that the ECU 200 may control the engine 300 to reduce or increase the rpm of the engine 300, and thus the reduce or increase, respectively, the power generated $P_{gen}$.

The power generated $P_{gen}$ by the genset 300, 310 may be reduced if the SOC of the battery array 30 approaches an upper control limit at which the battery array 30 may become overcharged. The power generated $P_{gen}$ by the genset 300, 310 may be increased if the SOC of the battery array 30 approaches a lower control limit at which the battery array 30 would be unable to drive the electric motors 50 and 60 with enough torque to propel the vehicle 10. In an exemplary embodiment of the vehicle 10 in which the engine 300 is a 2.5 liter Ford LRG-425 engine powered by compressed natural gas, the power generated $P_{gen}$ is 70 Hp.

Regenerative braking occurs between the times $t_3$ and $t_4$ when the vehicle 10 decelerates after release of the accelerator pedal and when the vehicle 10 travels on a downhill slope at a constant speed. During regenerative braking, the electric motors 50 and 60 function as generators and current is supplied to the battery array 30 by the electric motors 50 and 60. The power generated $P_{braking}$ during regenerative braking is stored in the battery array 30.

The power generated by the genset 300, 310 during maintenance of the cruising speed and the power generated by regenerative braking $P_{braking}$ is represented by the curve above the horizontal axis and the area defined by the curve above the horizontal axis represents the total energy creation and storage of the vehicle 10 during maintenance of the cruising speed and regenerative braking.

The power $P_{gen}$ of the genset 300, 310 and the regenerative braking power $P_{braking}$ are controlled by the ECU 200 to substantially equal the energy consumption (traction effort) of the electric motors 50 and 60 during acceleration. In other words, the area defined by the curve below the horizontal axis is equal to the area defined by the curve above the horizontal axis. The ECU 200 controls the traction effort of the electric motors 50 and 60 (including the peak power $P_{peak}$) and the power generated $P_{gen}$ so that the power generated and the power stored do not exceed the power consumed, and vice versa, so as to maintain the SOC of the battery array 30 within a range of control limits. The ECU 200 controls the power generated $P_{gen}$ and the traction effort of the electric motors 50 and 60 so that the ampere hours during energy consumption do not exceed the thermal capacity of the battery array during power creation and storage.

An exemplary embodiment of a method for controlling the SOC of the battery array will be explained with reference to FIGS. 8–12. The control method shown in FIGS. 8–12 is executed at predetermined time intervals during operation of the vehicle.

Figure 8:
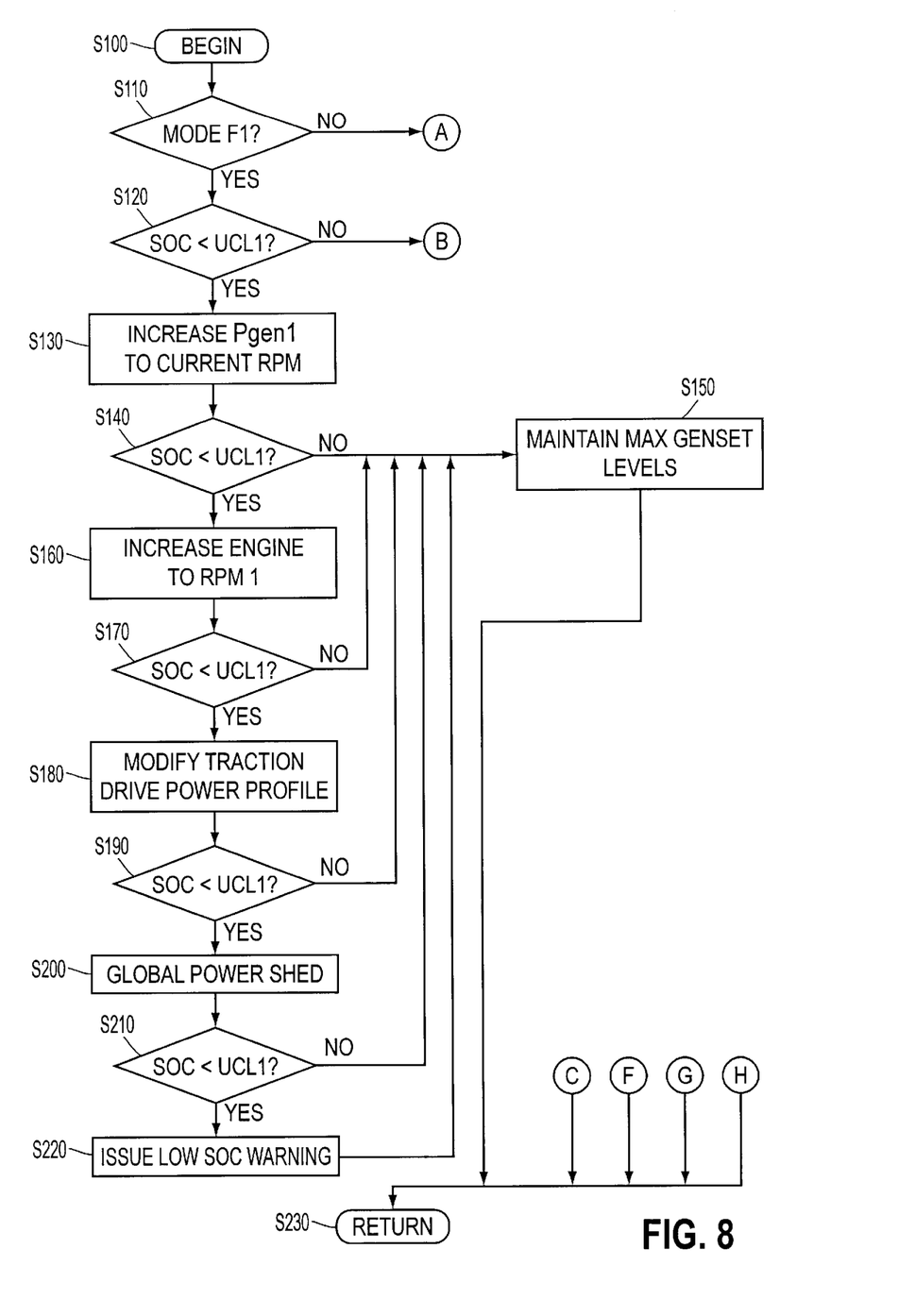
FIGS. 8–12 are flowcharts illustrating an exemplary control of the state of charge of the battery array of the series hybrid electric vehicle.

The control method begins in step S100 and proceeds to step S110 where it is determined if the vehicle is in the first driving mode F1. If the vehicle is in the first driving mode (S110: Yes) the control method proceeds to step S120 where the state of charge SOC of the battery array is compared to a first upper control limit UCL1 associated with the first driving mode F1. If the state of charge SOC is less than the first upper control limit UCL 1 (S120: Yes), the control method proceeds to step S130 and the power generated $P_{gen1}$ of the first driving mode F1 is increased to the current rpm of the engine 300, which determines the power generated by the genset 300, 310.

The control method then proceeds to step S140 and the state of charge SOC is again compared to the upper control limit UCL1. If the state of charge SOC is larger than or equal to the upper control limit UCL1 (S140: No), the control method proceeds to step S150 and the maximum levels of the genset 300, 310 (engine rpm and generator conversion rate) are maintained. The control method then returns to the beginning in step S230.

If the state of charge SOC is less than the upper control limit UCL1 (S140: Yes), the control method proceeds to step S160 and the engine rpm is increased to a first predetermined value RPM1 associated with the first driving mode F1. The state of charge SOC is compared to the upper control limit UCL1 in step S170 and if the state of charge SOC is lower than the upper control limit UCL1 (S170: Yes) the traction drive power profile of the electric motors 50 and 60 is modified in step S180 to decrease the peak power $P_{peak}$. If the state of charge SOC is equal to or higher than the upper control limit UCL1 (S170: No), the control method proceeds to step 150 and the maximum genset levels are maintained.

In step 190 the state of charge SOC is again compared to the upper control limit UCL1. If the state of charge SOC is lower than the upper control limit UCL1 (S190: Yes), a global power shed is performed in step S200 by reducing or turning off ancillary systems of the vehicle 10, such as lighting and heating. If the state of charge SOC is equal to or higher than the upper control limit UCL1 (S190: No), the control method proceeds to step 150 and the maximum genset levels are maintained.

The state of charge SOC is again compared to the upper control limit UCL1 in step S210. If the state of charge SOC remains lower than the upper control limit UCL1 (S210: Yes), a warning is issued to the vehicle operator. The control method then proceeds to step S150 and the maximum genset levels are maintained. If the state of charge SOC is equal to or higher than the upper control limit UCL1 (S210: No), the control method proceeds directly to step S150 and the maximum genset levels are maintained.

If the vehicle 10 is not in the first driving mode F1 (S110: No), the control method proceeds to step S310 (see FIG. 10) where it is determined if the vehicle is in the second driving mode F2. If the vehicle 10 is in the second driving F2 (S310: Yes) the control method proceeds to step S320. Steps S320 through S420 (FIG. 10) are identical to steps S120 through S220 (FIG. 8) except that the values UCL2, RPM2 and UD2 associated with the second driving mode F2 are used.

If the state of charge SOC of the battery array 30 is equal to or higher than the second upper control limit UCL2 (S320: No), the control method proceeds to steps S440 and S470 (see FIG. 11). Steps S440 through S500 are identical to steps S240 through S300 (FIG. 8) except that the values D2, UD2 and H2 associated with the second driving mode F2 are used.

If the vehicle 10 is not in the first driving mode F1 or the second driving mode F2 (S110: No and S310: No), the control method proceeds to a battery desulfation and equalization routine shown in FIG. 12. In step S510, the engine rpm and the power generated $P_{gen}$ are increased until the state of charge SOC of the battery array 30 equals a predetermined voltage $V_{DC}$. In step 520, the time at which the state of charge SOC of the battery array 30 is equal to the predetermined voltage $V_{DC}$ is compared to a predetermined time $T_p$. If the time T equal or exceeds the predetermined time $T_p$ (S520: Yes), the control method returns to the beginning in step S230. If the time T is less than the predetermined time $T_p$ (S520: No) the control method continues until the predetermined time $T_p$ is equaled or exceeded.

Figure 9:
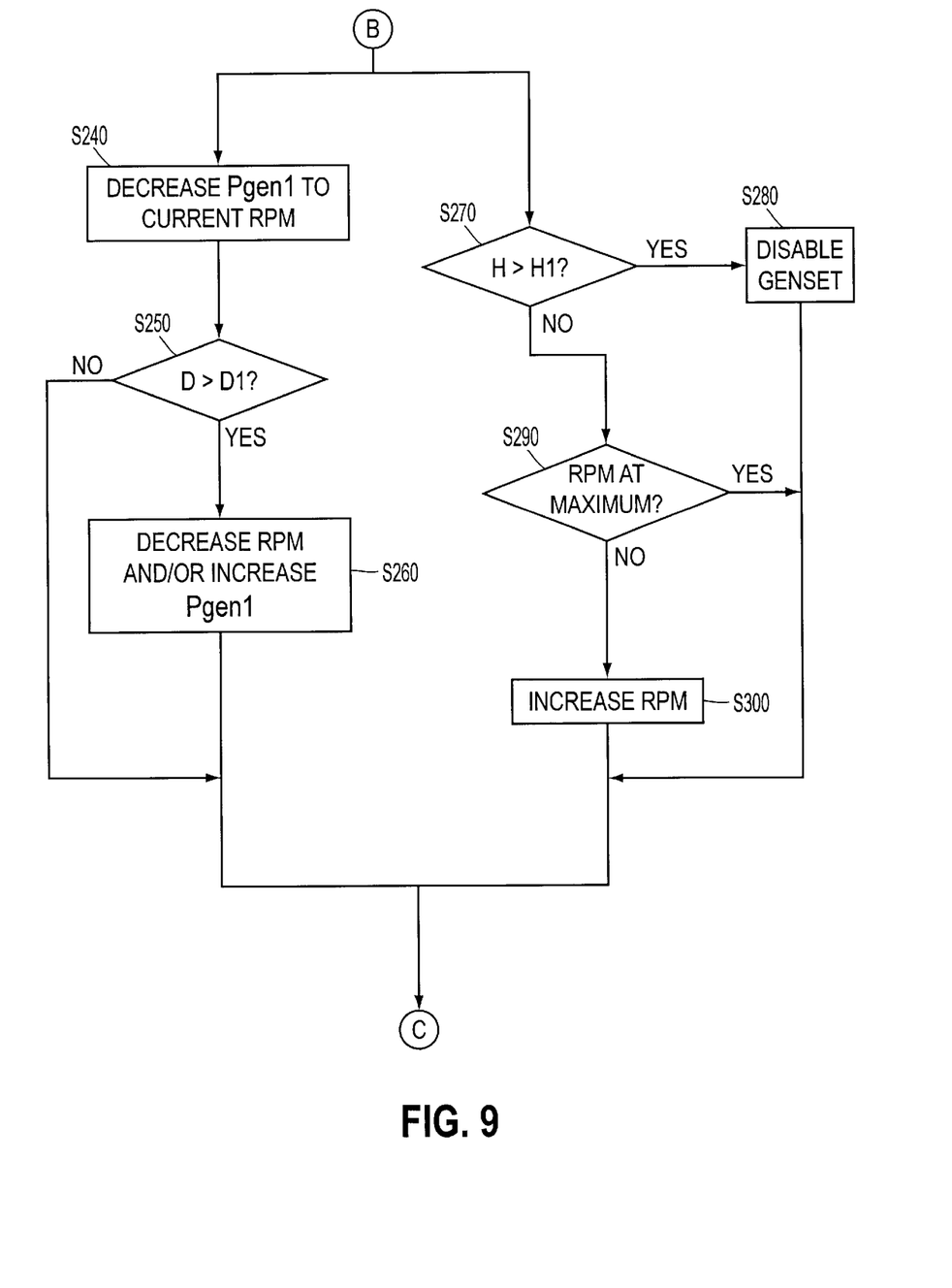
Figure 10:
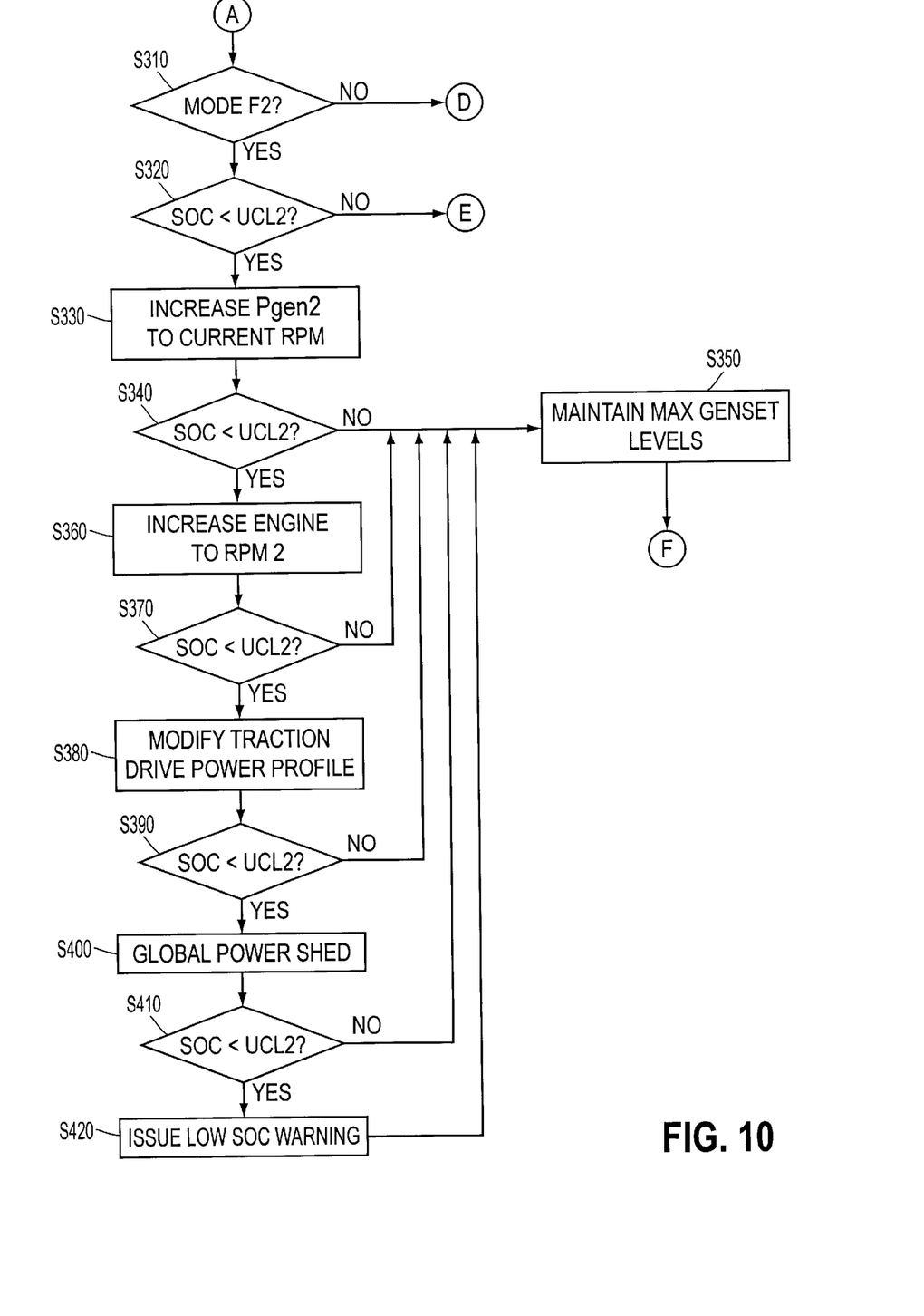
Figure 11:
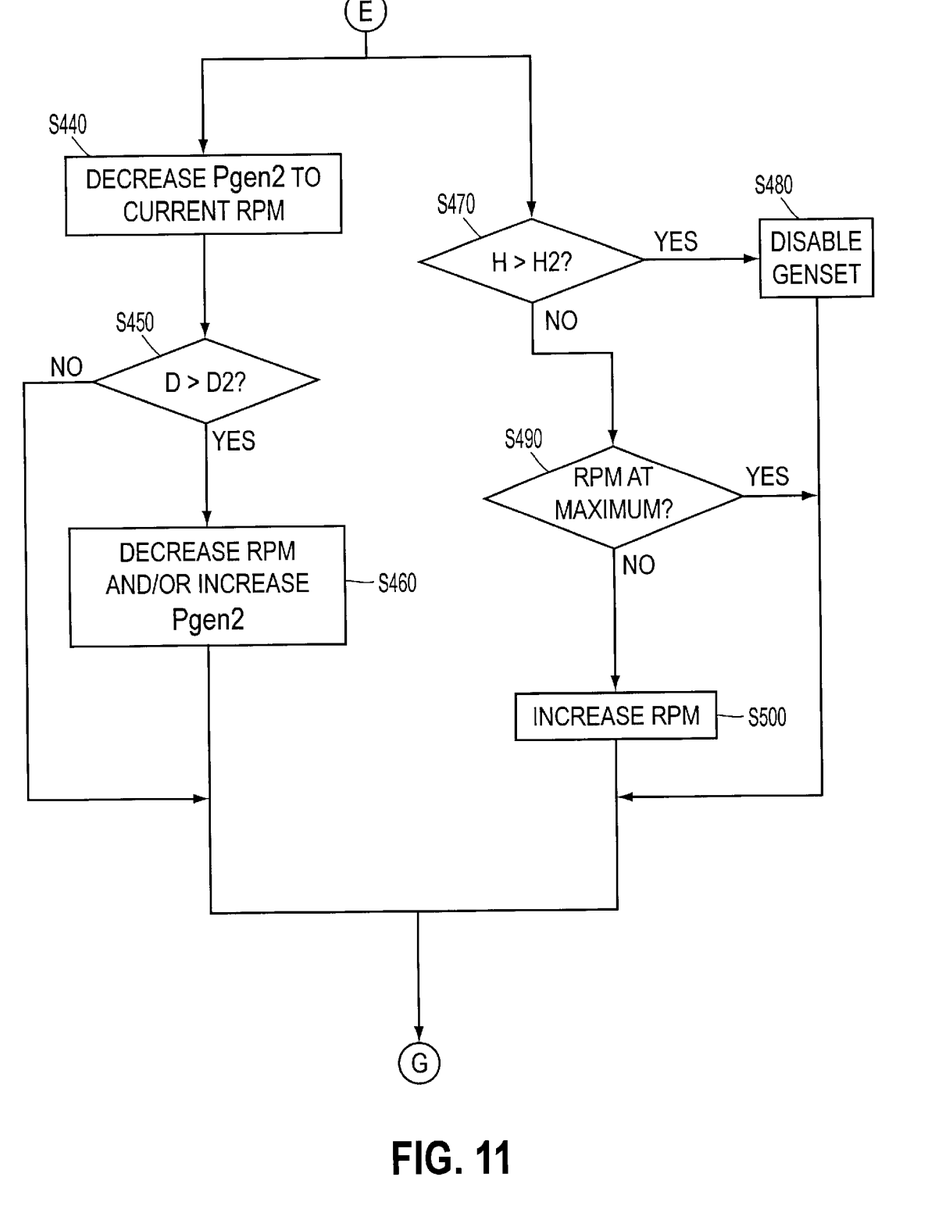
Figure 12:
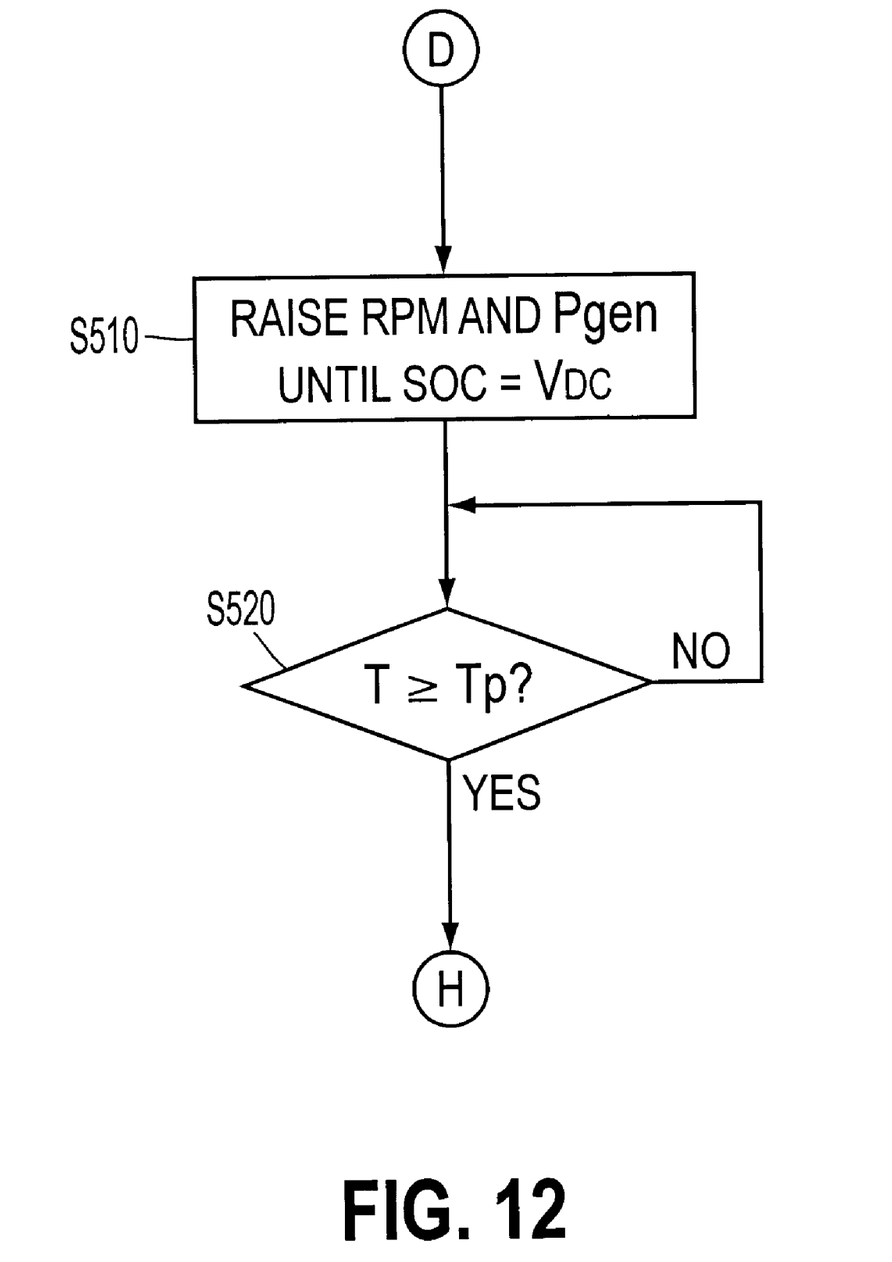

If the state of charge SOC is equal to or higher than the upper control limit UCL1 (S120: No), the control method proceeds to steps S240 and S270. As shown in FIG. 9, the control method proceeds on parallel paths. In step S240, the power generated $P_{gen}$ is decreased to the current rpm of the engine 300 and the control method proceeds to step S250. In step S250 the differential D between the genset load and the power generated $P_{gen}$ is compared to a predetermined differential D1 associated with the first driving mode F1. If the differential D is greater than the predetermined differential D1 (S250: Yes), the control method proceeds to step S260 and the rpm of the engine 300 is decreased and/or the power generated $P_{gen}$ is increased. The control metod then returns to the beginning in step S230. If the differential D is equal to or lower than the predetermined differential D1 (S250: No), the control method returns to the beginning in step S230.

In step 270, the heat output H of the engine is compared to a predetermined heat output H1 associated with the first driving mode F1. If the heat output H is larger than the predetermined heat output H1, the genset 300, 310 is disabled in step S280 and the control method returns to the beginning in step S230. If the heat output H is equal to or lower than the predetermined heat output H1, it is determined in step S290 if the engine rpm is at maximum. If the engine rpm is at maximum (S290: Yes), the control method returns to the beginning in step S230. If the engine rpm is not at maximum (S290: No) the engine rpm is increased in step S300 and the control methods then returns to the beginning in step S230.

It will be appreciated by those skilled in the art that the ECU can be implemented using a single special purpose integrated circuit (e.g., ASIC) having a main or central processor section for overall, system-level control, and separate sections dedicated to performing various different specific computations, functions and other processes under control of the PLC. The ECU also can be a plurality of separate dedicated or programmable integrated or other electronic circuits or devices (e.g., hardwired electronic or logic circuits such as discrete element circuits, or programmable logic devices such as PLDs, PLAs, PALs or the like). The ECU can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 8–12 and described herein can be used as the ECU. A distributed processing architecture can be used for maximum data/signal processing capability and speed.

While the invention has been described with reference to various exemplary embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A method for adaptively controlling a state of charge of a battery array of a series type hybrid electric vehicle including an internal combustion engine connected to a generator and at least one electric motor, comprising:

determining if the vehicle is in one of a plurality of forward driving modes;

comparing a state of charge of the battery array to an upper control limit associated with a forward driving mode;

decreasing the power generated by the generator, if the state of charge is equal to or greater than the associated upper control limit; and increasing the power generated by the generator, if the state of charge is less than the associated upper control limit.

2. The method of claim 1, further comprising:
determining if a differential between a load on the generator and the power generated by the generator is larger than a predetermined differential associated with a forward driving mode, if the state of charge is equal to or greater than the associated upper control limit; and
at least one of decreasing a speed of the engine and increasing the power generated by the generator, if the differential is larger than the predetermined differential.

3. The method of claim 1, further comprising:
determining if a heat output of the engine is larger than a predetermined heat output associated with the forward driving mode, if the state of charge is equal to or greater than the associated upper control limit;
determining if a speed of the engine is at a maximum, if the heat output is not larger than the predetermined heat output; and
increasing the speed of the engine, if the speed of the engine is not at the maximum.

4. The method of claim 3, further comprising:
disabling the generator, if the heat output of the engine is larger than the predetermined heat output.

5. The method of claim 1, further comprising:
comparing an intermediate state of charge to the associated upper control limit after increasing the power generated by the generator when the state of charge is less than the associated upper control limit; and
increasing a speed of the engine, if the intermediate state of charge is less than the associated upper control limit.

6. The method of claim 5, further comprising:
maintaining the generator at a maximum level, if the intermediate state of charge is equal to or larger than the associated upper control limit.

7. The method of claim 1, further comprising:
comparing an intermediate state of charge to the associated upper control limit after increasing the power generated by the generator when the state of charge is less than the associated upper control limit; and
decreasing a peak power output of the at least one electric motor, if the intermediate state of charge is less than the associated upper control limit.

8. The method of claim 7, further comprising:
maintaining the generator at a maximum level, if the intermediate state of charge is equal to or larger than the associated upper control limit.

9. The method of claim 1, further comprising:
comparing an intermediate state of charge to the associated upper control limit after increasing the power generated by the generator when the state of charge is less than the associated upper control limit; and
shedding power from the vehicle, if the intermediate state of charge is less than the associated upper control limit.

10. The method of claim 9, further comprising:
maintaining the generator at a maximum level, if the intermediate state of charge is equal to or larger than the associated upper control limit.

11. The method of claim 1, further comprising:
comparing an intermediate state of charge to the associated upper control limit after increasing the power generated by the generator when the state of charge is less than the associated upper control limit; and
issuing a warning, if the intermediate state of charge is less than the associated upper control limit.

12. The method of claim 11, further comprising:
maintaining the generator at a maximum level.

13. The method of claim 1, further comprising:
desulfating and equalizing the battery array, if the vehicle is not in a forward driving mode.

14. The method of claim 1, wherein the state of charge is an initial state of charge.

15. A series type hybrid electric vehicle, comprising:
an internal combustion engine connected to a generator;
a battery array receiving current at least from the generator;
at least one electric motor receiving current from the battery array; and
a controller that:
determines if the vehicle is in one of a plurality of forward driving modes;
compares a state of charge of the battery array to an upper control limit associated with a forward driving mode;
decreases the power generated by the generator, if the state of charge is equal to or greater than the associated upper control limit; and
increases the power generated by the generator, if the state of charge is less than the associated upper control limit.

16. The vehicle of claim 15, wherein the controller:
determines if a differential between a load on the generator and the power generated by the generator is larger than a predetermined differential associated with a forward driving mode, if the state of charge is equal to or greater than the associated upper control limit; and
at least one of decreases a speed of the engine and increases the power generated by the generator, if the differential is larger than the predetermined differential.

17. The vehicle of claim 15, wherein the controller:
determines if a heat output of the engine is larger than a predetermined heat output associated with the forward driving mode, if the state of charge is equal to or greater than the associated upper control limit;
determines if a speed of the engine is at a maximum, if the heat output is not larger than the predetermined heat output; and
increases the speed of the engine, if the speed of the engine is not at the maximum.

18. The vehicle of claim 17, wherein the controller:
disables the generator, if the heat output of the engine is larger than the predetermined heat output.

19. The vehicle of claim 15, wherein the controller:
compares an intermediate state of charge to the associated upper control limit after increasing the power generated by the generator when the state of charge is less than the associated upper control limit; and
increases a speed of the engine, if the intermediate state of charge is less than the associated upper control limit.

20. The vehicle of claim 19, wherein the controller:
maintains the generator at a maximum level, if the intermediate state of charge is equal to or larger than the associated upper control limit.

21. The vehicle of claim 15, wherein the controller:
compares an intermediate state of charge to the associated upper control limit after increasing the power generated by the generator when the state of charge is less than the associated upper control limit; and decreases a peak power output of the at least one electric motor, if the intermediate state of charge is less than the associated upper control limit.

22. The vehicle of claim 21, wherein the controller:

maintains the generator at a maximum level, if the intermediate state of charge is equal to or larger than the associated upper control limit.

23. The vehicle of claim 15, wherein the controller:

compares an intermediate state of charge to the associated upper control limit after increasing the power generated by the generator when the state of charge is less than the associated upper control limit; and sheds power from the vehicle, if the intermediate state of charge is less than the associated upper control limit.

24. The vehicle of claim 23, wherein the controller:

maintains the generator at a maximum level, if the intermediate state of charge is equal to or larger than the associated upper control limit.

25. The vehicle of claim 15, wherein the controller:

compares an intermediate state of charge to the associated upper control limit after increasing the power generated by the generator when the state of charge is less than the associated upper control limit; and issues a warning, if the intermediate state of charge is less than the associated upper control limit.

26. The vehicle of claim 25, wherein the controller:

maintains the generator at a maximum level.

27. The vehicle of claim 15, wherein the controller:

desulfates and equalizes the battery array, if the vehicle is not in a forward driving mode.

28. The vehicle of claim 15, wherein the state of charge is an initial state of charge.

29. The vehicle of claim 15, wherein a performance enhancement factor is at least 6.2.

* * * * *